United States Patent [19]

Marten

[11] 3,967,017

[45] June 29, 1976

[54] METHOD OF COATING A VEHICLE TEST BED ROLLERS

[76] Inventor: John Anthony Marten, Swan Lodge, Holt, Norfolk, England

[22] Filed: July 18, 1974

[21] Appl. No.: 489,804

Related U.S. Application Data

[60] Division of Ser. No. 318,906, Dec. 27, 1972, Pat. No. 3,841,151, Continuation-in-part of Ser. No. 124,403, March 15, 1971, abandoned.

[30] Foreign Application Priority Data

Mar. 17, 1970 United Kingdom............... 12867/70

[52] U.S. Cl. ............................ 427/405; 427/419; 427/423; 427/427
[51] Int. Cl.² .......................................... B05D 1/06
[58] Field of Search ............... 117/71 M, 71 R, 62, 117/105.2; 29/149.5 NM; 427/191, 193, 205, 225, 404, 405, 419, 423, 425, 190, 201, 203, 376, 387, 34; 428/325, 328, 404, 432, 469, 906

[56] References Cited

UNITED STATES PATENTS

| 2,588,421 | 3/1952 | Shepard .......................... 117/71 M |
| 2,833,668 | 5/1958 | Dailey et al. ..................... 117/71 M |
| 3,019,014 | 1/1962 | Miksis .............................. 427/425 |
| 3,031,331 | 4/1962 | Aves et al. ......................... 117/46 |

*Primary Examiner*—Cameron K. Weiffenbach
*Assistant Examiner*—R. Eugene Varndell, Jr.
*Attorney, Agent, or Firm*—Allegretti, Newitt, Witcoff & McAndrews

[57] ABSTRACT

A surface coating for vehicle test bed rollers which consists of ceramic, stainless steel, and molybdenum particles substantially blended together to form a wear resistant, composite core within said surface coating.

7 Claims, 4 Drawing Figures

U.S. Patent  June 29, 1976  3,967,017
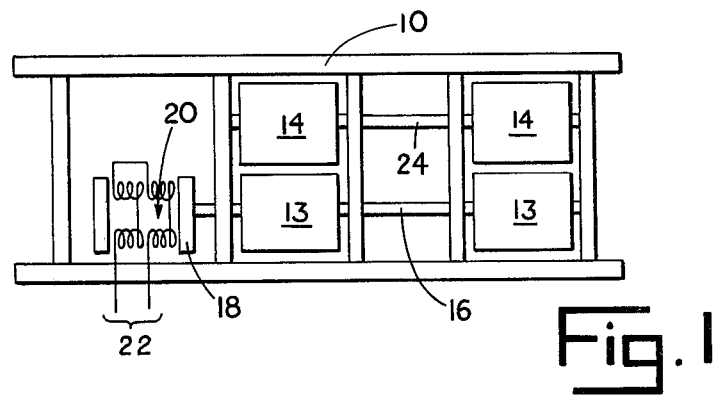
Fig. 1
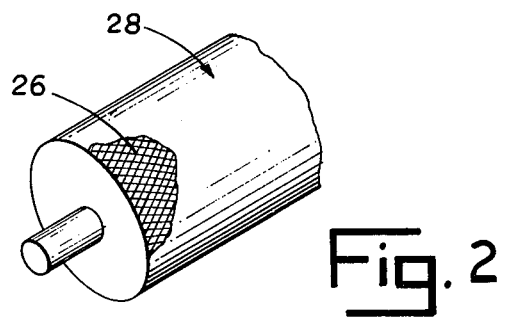
Fig. 2
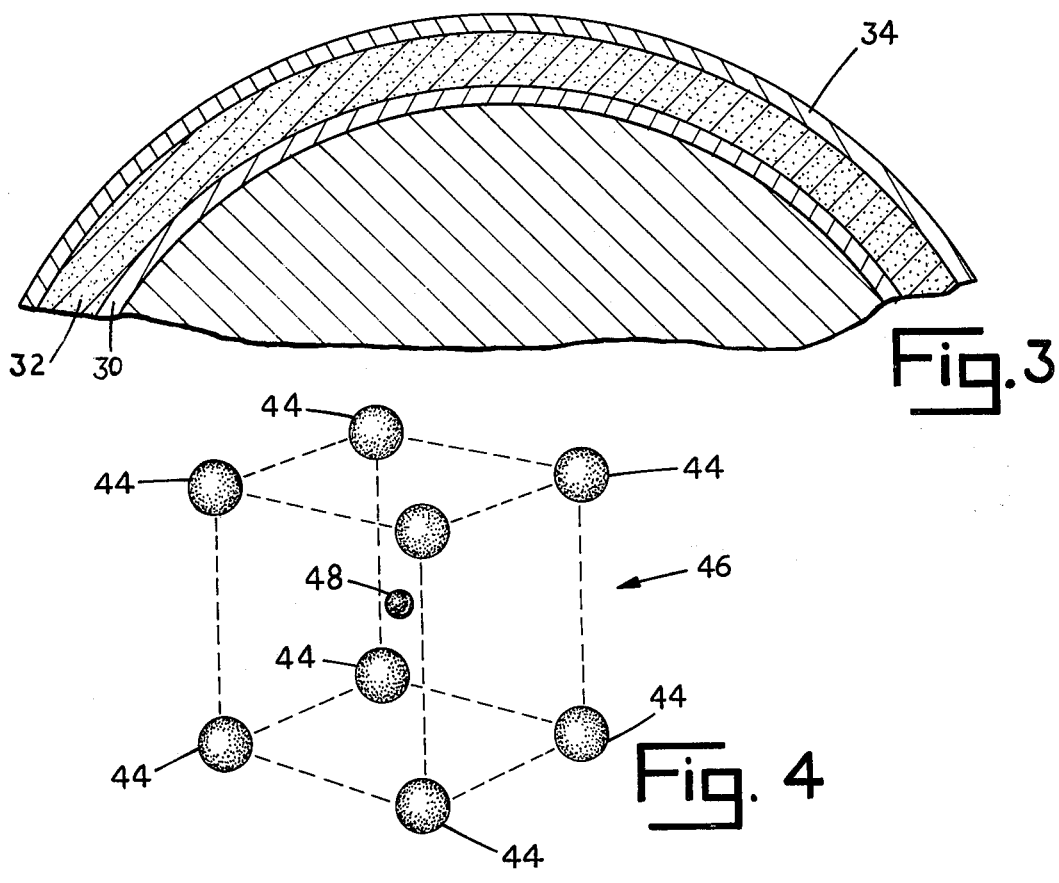
Fig. 3
Fig. 4

METHOD OF COATING A VEHICLE TEST BED ROLLERS

CROSS REFERENCE TO RELATED APPLICATIONS

This is a division of application Ser. No. 318,906, now U.S. Pat. No. 3,841,151, filed Dec. 27, 1972. Ser. No. 318,906 is a continuation-in-part application of Ser. No. 124,403 (now abandoned), filed Mar. 15, 1971.

BACKGROUND OF THE INVENTION

This invention relates to vehicle test beds, and more particularly, relates to a surface coating for the rollers in use in such vehicle test beds.

In many cases, it has been found to be more convenient to use a test bed to test a vehicle's performance than to test it on the road. Vehicle test beds usually have at least one pair of spaced parallel rollers for driving engagement with at least one wheel of a motor vehicle to be tested. Such test beds may be used for a number of purposes including, but not limited to, the following: (1) testing of the vehicle's brakes by driving at least one of the rollers against the brakes; (2) using the vehicle brakes to decelerate the rollers when they are (a) freely rotating or (b) when at least one of the rollers is connected to a high inertia such as a fly wheel (the rollers may, of course, have sufficient inherent inertia in some cases); and (3) checking the vehicle's power or torque characteristic against speed. In this case, at least one of the rollers is connected to a brake such as an eddy current brake.

It will be appreciated that the surface of the rollers must be sufficiently rough to prevent any appreciable degree of slip between the rollers and the vehicle's wheel or wheels. In order to obtain a sufficient degree of roughness on the surface of the rollers, various techniques have been developed.

In some cases, the rollers have been manufactured from steel with a knurled or otherwise roughened surface. Such surface finishes have been found to be satisfactory in many respects. However a problem arises in that after a period of use, the knurled or roughened surface wears or becomes polished to such a degree that a substantial and undesirable amount of slip between the wheels and the rollers takes place.

In other cases, the rollers have been coated. It is known, for example, that the roller may be coated with concrete or flame sprayed with stainless steel. In so coating a roller, two problems are encountered.

The first problem is again the wearing smooth of the coating. The second problem involves what is generally characterized as the "burst speed" of the coating.

As a coated roller is rotated, centrifugal force is exerted on the coating. The "burst speed" is the speed at which a coating will shatter due to centrifugal stress.

The centrifugal force or stress which a coating can withstand depends upon its ultimate tensile strength. The ultimate tensile strength of concrete is quite low. A concrete roller, therefore, cannot be used in a relatively high speed device.

A coating comprising stainless steel particles flame sprayed onto the roller has a sufficiently high ultimate tensile strength, but it is subject to relatively rapid abrasion. As the coating wears smooth, slippage of course will occur, resulting in invalid test data.

SUMMARY OF THE INVENTION

Accordingly, it is an object of the present invention to provide an improved surface coating for rollers used in vehicle test beds.

It is also an object of the present invention to provide an improved surface coating which is sufficiently rough to prevent appreciable slippage between the roller and the tire of the vehicle being tested.

It is still another object of the present invention to provide an improved surface coating which is highly resistant to wear and abrasion.

The foregoing objects are accomplished by incorporating molybdenum and ceramic particles into a stainless steel coating in such a way that a substantial degree of blending occurs between the materials. Significantly, the ceramic particles diffuse into the stainless steel particles to give the "rough" stainless steel coating an improved wear resistance.

DESCRIPTION OF THE DRAWINGS

One embodiment of the present invention will be described by way of example with reference to the accompanying drawing, in which:

FIG. 1 is a schematic plan view of a preferred form of a vehicle test bed made in accordance with the invention;

FIG. 2 is a fragmentary, enlarged, perspective view of a portion of one of the rollers of the vehicle test bed shown in FIG. 1;

FIG. 3 is a fragmentary, traverse cross-sectional view of a portion of a coated roller of the vehicle test bed shown in FIG. 1;

FIG. 4 is a perspective of the particle structure of the roller coating shown in FIG. 3.

DESCRIPTION OF THE PREFERRED EMBODIMENT

The vehicle test bed shown in FIG. 1 comprises a chassis dynamometer having a frame 10 in which two pairs of parallel rollers 13 and 14 are rotably mounted. The rollers 13 are fixedly mounted on a common rotable shaft 16, one end of which is connected to a rotor 18 of a eddy current brake generally indicated at 20. The braking torque of brake 20 depends on the current passed through the stator coils via the leads 22. The rollers 14 are fixedly mounted to a freely rotable common shaft 24.

Each of the rollers 13 is formed of steel and has a surface coating which incorporates molybdenum, ceramic, and stainless steel material or particles. Preferably, the ceramic material is comprised primarily of aluminum oxide with about 3.3% titanium oxide plus other oxides in amounts less than 1%. These ingredients generally increase the hardness of the surface coating. Roller 13 is shown in FIG. 2 where the surface of the steel roller is shown at 26 to be knurled. The surface coating is shown generally at 28.

In FIG. 3, a portion of a coated roller is shown in cross-section. Immediately adjacent to the surface of the roller is a relatively pure molybdenum layer 30. On top of this molybdenum layer 30 is a composite molybdenum-ceramic-stainless steel core 32. On top of the composite core 32 is a relatively pure stainless steel layer 34. It should be noted that the thickness of each of the layers shown in FIG. 3 is exaggerated in relation to the radius of the roller for the sake of clarity.

A roller is manufactured in accordance with the foregoing features of the present invention by coating the cylindrical surface of a steel roller with molybdenum, flame spraying the molybdenum-coated roller with stainless steel particles, bonding a coat of ceramic powder to the flame-sprayed roller, and finally flame spraying the ceramic-coated roller with a second layer of stainless steel particles. The minimum thickness of each layer is given in the following table:

| Layer | Minimum Thickness (Inches) |
| --- | --- |
| Molybdenum | 0.003 |
| First Stainless Steel | 0.005 |
| Ceramic | 0.008 |
| Second Stainless Steel | 0.003 |

In that each layer is very thin, each application is, in effect, a rewelding of the previous layers. The result is a considerable degree of blending between the layers. Significantly the ceramic layer or particles become dispersed in the stainless steel layers. This blending creates the composite core 32 discussed above. So blended, the surface coating generally exhibits the features of each individual layer.

The molybdenum layer is significant for two reasons. First it provides a "rust barrier" between the steel roller and the chromium in the stainless steel. In the presence of moisture, this combination of steel and chromium forms an "electric cell" highly susceptible to galvanic corrosion. Second, the molybdenum layer provides excellent adhesion between the coating and the steel roller. This results from the metallurgical bonding which occurs between the molybdenum and the steel roller. Such adhesion is necessary to give the coating a high "burst speed."

The stainless steel particles give the surface the desired degree of roughness. As discussed previously, this is necessary to create a high degree of friction between the roller and the tire of the vehicle being tested.

The ceramic particles provide the coating with excellent wear resistant characteristics. The particles are of "jewel" hardness, 1,400 on the Vickers scale, and thus surface coating is far more resistant to abrasion than the prior art rollers and coatings.

It should be noted that the actual wear pattern of the roller is initially like that found in a roller coated solely with stainless steel particles. However, as the ceramic particles are exposed, the polishing of the roller is drastically retarded. This is due to the generally pure outermost layer of stainless steel 34, i.e., a thin, outermost layer into which no ceramic particles have diffused.

In effect, the outer stainless steel particles wear away to expose a stainless steel-ceramic interface. This interface marks the beginning of the composite core 32. The ceramic particles at this interface substantially retard abrasion. The stainless steel particles at the interface provide the roughness necessary to avoid slip.

FIG. 4 depicts the particle arrangement of the composite core 32. The stainless steel particles 44 form a matrix pattern shown, for example, at 46 as a cube. Upon diffusion, the ceramic particles 48 fill the matrix 46 interstitially. It is therefore preferable that the size of ceramic particles be approximately 45 to 70 microns and the stainless steel particles be approximately 3 to 10 times larger.

Those skilled in the art will recognize that the preferred embodiment may be altered and modified without departing from the true spirit and scope of the invention as defined in the appended claims.

What is claimed is:

1. A method for coating a metallic roller with an abrasive, wear-resistant surface coating comprising the steps of:
   coating said roller with an innermost layer of molybdenum particles;
   flame spraying onto said innermost layer a first intermediate layer of stainless steel particles, a second intermediate layer of ceramic particles, and an outermost layer of stainless steel particles, said stainless steel particles being larger than said ceramic particles; and blending said molybdenum, stainless steel, and ceramic particles to form a composite molybdenum-ceramic-stainless steel core within said surface coating.

2. A method as claimed in claim 1 wherein said innermost layer of molybdenum particles has a thickness of at least 0.003 inches, said first intermediate layer of stainless steel particles has a thickness of at least 0.005 inches, said second intermediate layer of ceramic particles has a thickness of at least 0.008 inches, and said outermost layer of stainless steel particles has a thickness of at least 0.003 inches.

3. A method of covering a metallic roller comprising the steps of:
   coating said roller with molybdenum particles;
   flame spraying a first layer of stainless steel particles onto said molybdenum particles; and
   coating said first layer with ceramic particles, said stainless steel particles being larger than said ceramic particles, whereby said ceramic particles blend into said first layer of stainless steel particles to produce an abrasive, wear-resistant surface coating on said roller.

4. A method as claimed in claim 3 further comprising the step of flame spraying a second layer of stainless steel particles onto said abrasive, wear-resistant surface coating, said second layer diffusing into said surface coating.

5. A method as claimed in claim 4 wherein said molybdenum particles blend into said surface coating to form a composite molybdenum-ceramic-stainless steel core within said surface coating.

6. A method as claimed in claim 3 wherein said ceramic particles are 45 to 70 microns in diameter.

7. A method as claimed in claim 6 wherein said stainless steel particles are 135 to 700 microns in diameter.

* * * * *